United States Patent [19]

Eiselt et al.

[11] Patent Number: 5,619,320
[45] Date of Patent: Apr. 8, 1997

[54] METHOD AND APPARATUS FOR MEASURING DISPERSION ZERO ALONG AN OPTICAL FIBER

[75] Inventors: Michael H. Eiselt, Long Branch; Robert M. Jopson; Rogers H. Stolen, both of Rumson, all of N.J.

[73] Assignee: Lucent Technologies Inc., Murray Hill, N.J.

[21] Appl. No.: 551,216

[22] Filed: Oct. 31, 1995

[51] Int. Cl.[6] .......................... G01N 21/84; G01D 11/00
[52] U.S. Cl. ........................................................ 356/73.1
[58] Field of Search ............................................ 356/73.1

[56] References Cited

PUBLICATIONS

"Four–Wave Mixing in an Optical Fiber in the Zero–Dispersion Wavelength Region", K. Inoue, Journal of Lightwave Technology, pp. 1553–1561, V. 10, No. 11, Nov. 1992.

"Technique for Measuring the Distributed Zero–Dispersion Wavelength of Optical Fibers Using Pulse Amplification Caused by Modulation Instability", Electron. Letters, V. 31, No. 3 pp. 225–226 2 Feb 1995, Nishi et al.

*Primary Examiner*—Vincent P. McGraw

[57] ABSTRACT

A method and apparatus for non-destructively measuring dispersion-zero wavelengths along an optical fiber makes use of a four-photon-mixing technique to generate mixed, amplified, idler signals at positions or ranges along the fiber. The dispersion zero wavelengths are then calculated using the wavelengths of the generated idler signals after taking into account inaccuracies due to higher order phenomena.

26 Claims, 4 Drawing Sheets

METHOD AND APPARATUS FOR MEASURING DISPERSION ZERO ALONG AN OPTICAL FIBER

BACKGROUND OF THE INVENTION

1. Field of the Invention

The present invention relates to a method and apparatus for the non-destructive measurement of the dispersion zero along an optical fiber.

2. Description of Related Art

Traditional measurements of the chromatic dispersion of an optical fiber provides its integral value over a fiber span. One of the more common methods of doing so is to measure the group delay of the span as a function of wavelength. Dispersion is derived from the relationship $$D(\lambda) = -\frac{2\pi c}{\lambda^2} \ddot{\beta}(\omega)$$

where c is the speed of light, $\ddot{\beta}$ is the second derivative of $\beta(\omega)$ the frequency dependent propagation constant in the fiber with respect to $\omega$, the angular frequency, and $\lambda$ is the wavelength. Since the group delay is proportional to the first derivative of $\beta(\omega)$ with respect to $\omega$, $D(\lambda)$ can be obtained by taking the derivative of the group delay with respect to $\omega$. However, this measurement only provides the average dispersion of the fiber as noted above.

Detailed knowledge of the actual dispersion along a fiber span, rather than its average, becomes more important as lightwave systems move towards the use of higher optical powers, longer span lengths, higher bit rates, and wavelength multiplexing. This is because controlled variations in dispersion along the fiber (called "dispersion management") has become a tool used by some system designers to suppress optical non-linearities and to manipulate these non-linearities to further enhance system performance. Without dispersion management, these optical non-linearities would cause spectral broading, increased pulse spreading, and mixing of multiplexed wavelength channels. While dispersion management is particularly useful in soliton systems and systems which span trans-oceanic distances, dispersion management is increasingly being applied to high performance, non-return-to-zero terrestrial systems as well. If dispersion management is to be effective one needs to know about unintentional variations in dispersion along individual lengths of fiber. Thus, there is interest in developing methods and apparatuses for the non-destructive measurement of the variation in dispersion along the length of an optical fiber. In any fiber, the dispersion passes through zero at some wavelength, $\lambda_0$. This wavelength is referred to as the zero-dispersion wavelength. The value of $\lambda_0$ along the fiber is a particularly convenient way to characterize dispersion along the fiber.

In dispersion-shifted fiber (DSF) the dispersion is known to vary as a function of location in the fiber. In one experiment using a ten kilometer ("km") length of DSF fiber, which was cut into four, 2½ km segments, it was found that the average zero-dispersion wavelength of the segments varied by at least 1 nanometer ("nm"). See K. Inoue, "Four-wave mixing in an optical fiber in the zero-dispersion wavelength region", Journal of Lightwave Technology, v. 10, pp. 1553–1561, (1992).

Recently, a non-destructive, remote-measurement technique was used to determine the local zero-dispersion wavelength of an optical fiber by observing, on an optical time domain reflectometer, the gain that occurs at wavelengths slightly longer than the zero-dispersion wavelength (referred to as "modulation instability pulse amplification"), see S. Nishi and M. Saruwatari, "Technique for measuring the distributed zero-dispersion wavelength of optical fibers using pulse amplification caused by modulation instability", Electron. Lett., v. 31, pp. 225–226 (1995). The results achieved appear to indicate a wavelength resolution of several tenths of a nanometer, and a distance resolution of a kilometer or so. This technique offers the advantage of requiring access to only one end of the fiber. However, this new technique appears to require the accurate measurement of small (a few tenths of a decibel) changes in the level of a backscattered signal.

SUMMARY OF THE INVENTION

It is therefore an object of the present invention to provide a non-destructive method and apparatus for the measurements of the zero-dispersion wavelength along an optical fiber.

It is also an object of the present invention to provide an apparatus for non-destructively determining the dispersion of an optical fiber at points along the fiber which comprises a first signal source operating at a first wavelength and outputting a first pulse train of optical pulses each having a first pulse width; the apparatus further comprising a second signal source operating at a second wavelength and outputting a second pulse train of optical pulses, each having a second pulse width, the second wavelength being separated in wavelength from the first wavelength, and optical pulses of the first and second pulse trains being separated by a delay such that at least one optical pulse of the first pulse train overlaps with at least one optical pulse of the second pulse train at a point along the fiber having a length of a specified range; and further comprising a combiner for combining the first and second pulse trains into a mixed pulse train and for inputting the mixed pulse train into the fiber.

It is a further object of the invention to provide for a method for non-destructively determining the zero-dispersion wavelengths of an optical fiber at points along the fiber comprising generating a first pulse train of optical pulses each having a first pulse width at a first wavelength; generating a second pulse train of optical pulses each having a second pulse width at a second wavelength, the second wavelength being separated in wavelength from the first wavelength; generating a delay between pulses of the first and second pulse trains such that at least one optical pulse of the first pulse train overlaps with at least one optical pulse of the second pulse train at a point having a length of a specified range along the fiber; optically combining the first and second pulse trains into a mixed pulse train; and inputting the mixed pulse train into the fiber.

BRIEF DESCRIPTION OF THE DRAWINGS

The invention is described in relation to the accompanying drawings, in which.

DETAILED DESCRIPTION OF THE PREFERRED EMBODIMENTS

One technique which may be used in measuring nonlinear aspects of optical dispersion can be explained as follows. Two pulsed signals of the form $E_j = E_j(x,y,z)e^{i[\beta(\omega_j)z - \omega_j t]}$ propagating down the length of an optical fiber may be combined using a technique known, by those skilled in the art, as four-photon-mixing. One of the four-photon-mixing products which results will be a third signal having an angular frequency, $\omega_i = 2\omega_p - \omega_s$. The subscripts distinguish each signal from one another with s, p, and i indicating a signal, pump and idler wave or signal respectively. As is well-known, the maximum power of the resulting idler signal will occur when these signals are phased matched, that is, when $0 = \Delta\beta = 2\beta(\omega_p) - \beta(\omega_s) - \beta(\omega_i)$. Thus, at a point or specified range in the fiber where the signals s and p overlap and are phase-matched an amplified idler or mixed signal will be generated. Importantly, phase matching also occurs when $\omega_p$ is set to a dispersion zero of the fiber. By tuning $\omega_p$ through a range of wavelengths containing the wavelength corresponding to a dispersion zero of the fiber while at the same time looking for the maximum power at a frequency $\omega_i$ or wavelength $\lambda_i$, the appropriate wavelength for phase matching may be obtained. This wavelength can be then used to determine the zero-dispersion wavelength of a point along the optical fiber. Sufficient distance resolution may be obtained by using pulsed light of two widely separated wavelengths having different group velocities. The timing of the pulses at $\omega_s$ and $\omega_p$ can be adjusted so that the point where the pulses overlap may be shifted down the length of the fiber or fiber span.

The value $\omega_i$ can be determined by locating the peak (or peaks) which result from four-photon-mixing using a detector such as one incorporated within an optical spectrum analyzer. Once determined $\omega_i$, can be used to determine $\omega_p$ which can then be adjusted slightly to take into account two phenomena; Kerr-effect power shifts and any high-order-curvature of $\beta(\omega)$.

Figure 1:
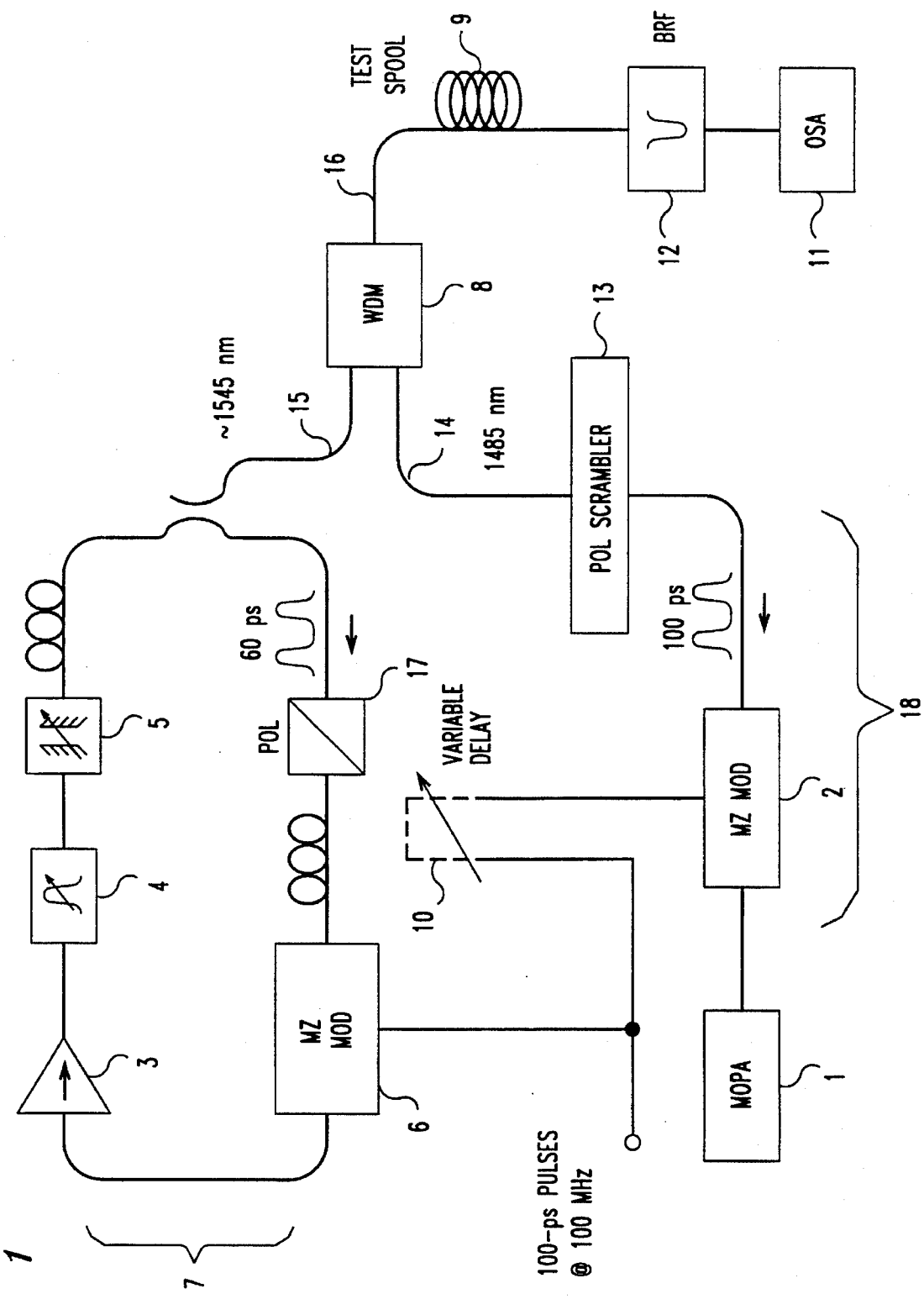
FIG. 1 is an apparatus for non-destructively measuring wavelengths corresponding to zero-dispersion along an optical fiber according to one embodiment of the present invention.

An apparatus according to one embodiment of the present invention used to measure dispersion-zero wavelengths at points along an optical fiber following the above explanation is shown in FIG. 1. A master oscillator/laser power amplifier chip 1 operating at a wavelength of, for example, 1486.45 nm, provides a signal to a LiNbO$_3$ Mach-Zehnder modulator 2 to generate a pulse train of optical pulses having a full-width, half maximum ("FWHM") pulse of 100 picoseconds ("ps"). The chip 1, modulator 2 and a polarization scrambler 13 may be referred to as signal source 18. Though the scrambler 13 is shown modifying the polarization of signal 14 from the signal source 18 it will be recognized by those skilled in the art that the scrambler could also be used to modify the polarization of signal 15 from a pump source 7 or modify the polarizations of both signals 14, 15.

A ring laser 7 generates pulses with a FWHM of 60 ps tunable over its bandwidth using a 4 nm, thin-film tunable band pass filter 4 and 0.1 nm, tunable Fabry-Perot filter 5. The filters 4 and 5 may be referred to as a tuner. A second LiNbO$_3$ Mach-Zehnder modulator 6 provides active mode-locking. The modulator 6 receives polarized light from the polarizer 17. An erbium doped fiber amplifier 3, bandpass filter 4, Fabry-Perot filter 5 modulator 6 and polarizer 17 can be referred to as an EDFA ring laser or "pump" source 7. The pump source 7 can be scanned over a 3 nm range centered on 1546 nm. This can be accomplished by centering the filter 4 on 1546 nm and scanning the Fabry-Perot filter 5 over the desired range.

Though in this embodiment of the invention lasers are used as the light sources, it will be recognized by those skilled in the art that other types of light sources such as LEDs, erbium-doped fiber amplifiers or white light sources may also be used. The pump source 7 may be referred to as the first signal source while the signal source 18 may be referred to as the second signal source.

The pulse train output from the pump source 7 will hereafter be referred to as the "first" pulse train 15 operating at a "first" wavelength, e.g. 1546 nm, having a "first" pulse width of 60 ps. The pulse train output from the signal source 18 will hereafter be referred to the "second" pulse train 14 operating at a "second" wavelength, e.g. 1486.5 nm, having a "second" pulse width of 100 ps.

The first and second pulse trains may be combined using a 1480/1550 wavelength-division multiplexer ("WDM") or combiner 8 and then coupled into a test fiber 9. The delay between pulses of the first and second pulse trains can be adjusted by placing a variable delay line or device 10 on an input feeding modulator 2. A differential delay between the pulses of the first and second pulse trains, used to generate the curves in FIGS. 2 and 3, was approximately 1330 ps over the 9.7 kilometer length of the fiber 9. Such a delay generated an overlap having a specified range of approximately 1 km within the fiber 9. An amplified, "idler" or mixed pulse train 16 at an "idler" wavelength is generated by a four-wave mixing process using signals 14 and 15 where signals 14 and 15 overlap.

Figure 2:
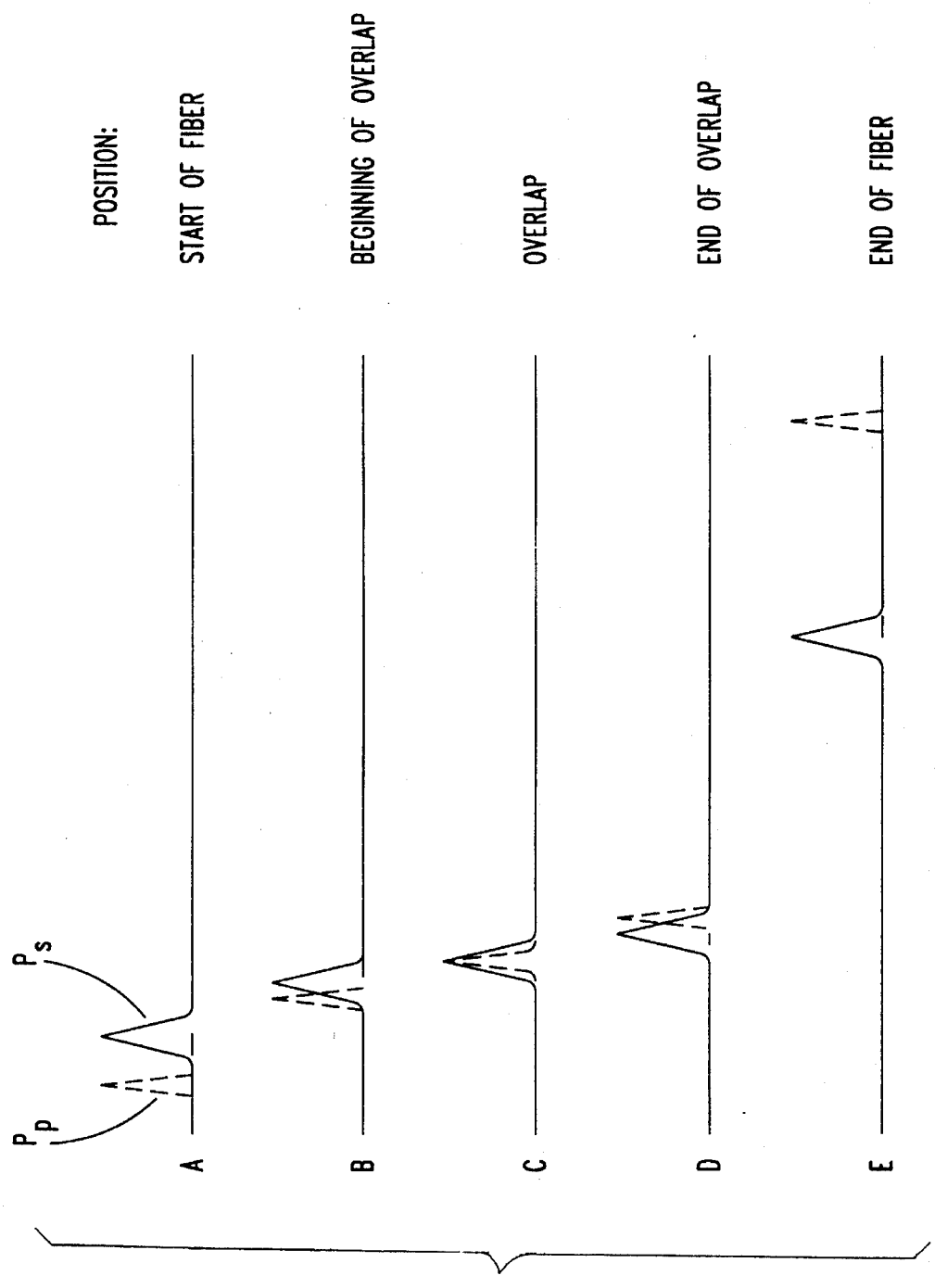
FIG. 2 shows the position of two pulses relative to each other in the fiber after a relative input delay is adjusted using the apparatus of FIG. 1.

FIG. 2 shows an example of two pulses $P_p$ and $P_s$ where $P_p$ is a pulse from the first pulse train operating at approximately 1546 nm and $P_s$ is a pulse from the second pulse train operating at approximately 1486.45 nm, respectively, at various points along the fiber 9, at various times (time is labelled A-E).

At the start, time A, $P_p$ and $P_s$ are initially separated by a delay. As time increases from A to B the faster pulse, $P_p$, catches up to, and begins to overlap with $P_s$. Subsequently, $P_p$ completely overlaps and passes $P_s$ at times C-E. At time E, pulse $P_p$ has reached the end of fiber 9.

It should be noted that the separation between $P_p$ and $P_s$ has been greatly exaggerated for illustrative purposes. In reality, the separation is alot smaller.

Referring back to FIG. 1, at an input to the test fiber 9 the signal 14 may have a peak power of 0 dBm while the signal 15 may have a peak power of +17 dBm. The amplified idler or mixed signal 16 may be detected and observed on a display of an optical spectrum analyzer 11. A travelling-wave Bragg grating, band-reject filter 12 may be used to reduce the approximately 1546 nm signal entering the optical spectrum analyzer 11 in order to reduce scattering-induced background noise within the analyzer 11.

Based on predictions, the mixed signal 16 may be expected to generate a peak around 1610 nm. The amount of light generated at 1610 nm depends on the phase mismatch and the polarization of the first and second pulse trains. By changing the input polarization, mixing efficiency may be changed by more than 10 dB. Because polarization changes with wavelength and also with propagation in a fiber, a commercially-available, great-circle polarization scrambler 13 may be used to modulate the polarization of signal 14 at a frequency of 3 MHz. By doing so the polarization dependence of the output signal 16 may be shown to be less than 0.2 dB. In addition, spectral features obtained using the scrambler 13 may closely mimic those obtained by optimizing the polarization of signal 14 at each wavelength.

Though the measurements described above require that $\omega_p$ be scanned or tuned near the wavelength corresponding to a dispersion-zero wavelength of an optical fiber, as will be recognized by those skilled in the art, these measurements will work in some fashion at any wavelength $\omega_s$ for the signal pulses.

The distance, or time, which corresponds to the amount of overlap between pulses of both pulse trains decreases with respect to the difference between $\omega_s$ (of signal 14) and $\omega_p$ (of signal 15). Specifically, the overlap decreases with respect to the −2 power of the difference between $\omega_s$ and $\omega_p$. Thus, a large wavelength (or frequency) separation would provide good position resolution. In this manner the position resolution or amount of overlap may be specified (or controlled) to a specific range (e.g. 1 km) by varying, among other things, the wavelengths (and therefore the wavelength separation) of signals 14 and 15. Though a wavelength separation of at least 60 nm is used in the above embodiment of the invention, smaller separations may also be used. The amount of overlap, therefore, at any given time using a pulse from signal 14 and a pulse from signal 15 will be small. The smaller the overlap the greater the accuracy in pinpointing the position along a fiber where the zero-dispersion wavelength is to be measured. The trade-off, however, comes in the amount of amplified power in signal 16 which results from such a small overlap. In summary, the smaller the overlap the less power generated by the signal 16 (,i.e. idler signal) created by the overlap. The power level is important when it comes to the capability of detecting the signal 16 on optical spectrum analyzer 11. The power must be sufficient so signal 16 can be detected over the noise floor inherent in the system and in the optical spectrum analyzer 11. In this embodiment of the invention, a wavelength of 1485 nm was chosen as the wavelength of signal 14 because of the availability of high-power sources at this wavelength. It should be noted that, though the present invention allows for improvements in position resolution by using other, especially shorter, pulse widths than those used in the above embodiment, there is another trade-off. Decreasing the pulse width much below 30 ps leads to a decrease in wavelength resolution of the measured zero-dispersion wavelength though the use of such a pulse width is within the scope of the present invention. Typically, this may not be much of a problem because pulse widths will be dictated by the availability of equipment capable of generating such pulses rather than by optimizing the position-wavelength trade-off mentioned above. It should also be noted that the selection of a wavelength for signal 14 is somewhat governed by losses which may increase depending on the wavelength selected.

Based on the above, though one embodiment of the invention realized a position resolution of 1 km, smaller ranges may be generated bearing in mind the above-mentioned trade-offs.

In general, when $\omega_p$ corresponds to a zero-dispersion wavelength, $\lambda_0$, a maximum mixing efficiency, i.e., maximum power in a pulse of signal 16, will occur. However, two high-order phenomenon will change the value of $\omega_p$ for maximum mixing efficiency.

The first phenomenon which affects the calculation of $\lambda_0$ is due to the curvature (i.e. plot) which results from realizing results based on the equation $0=\Delta\beta\equiv 2\beta(\omega_p)-\beta(\omega_s)-\beta(\omega_i)$. Since $0=\Delta\beta\equiv 2\beta(\omega_p)-\beta(\omega_s)-\beta(\omega_i)$ results in values greater than $\beta^{(2)}$, i.e., values of $\beta^{(4)}$ or more, these higher-order values create inaccuracies in calculating $\lambda_0$ from $0=\Delta\beta\equiv 2\beta(\omega_p)-\beta(\omega_s)-\beta(\omega_i)$. This inaccuracy, or shift, in $\lambda_0$ can be determined by calculating the curvature of $\beta(\omega)$ at a given point along an optical fiber. In practice, it has been found that the curvature of $\beta(\omega)$ does not vary significantly with changes in the dispersion zero point of an optical fiber. In fact, experiments indicate that the average curvature of $\beta(\omega)$ obtained from conventional chromatic dispersion measurements over the experimental 9.7 km fiber span 9 were sufficient to determine the shifts or inaccuracies to within ±0.1 nm at any location along the fiber 9. For purposes of the apparatus shown in FIG. 1, the phase matched, uncorrected wavelength was corrected by adding 1.2 nm to arrive at a corrected wavelength. This adjustment pertains to the fiber used in the above embodiment of the invention. As will be recognized by those skilled in the art, this adjustment will vary depending on the fiber used.

The second phenomenon which affects the calculation of $\lambda_0$ is known as the Kerr-effect. Kerr-effect "shifts" occur because the refractive index of an optical fiber changes when high-power laser sources are used. However, Kerr-effect shifts are negligible when optical power levels are kept below a certain threshold known to those skilled in the art. The power levels used in the apparatus in FIG. 1 are below such a threshold. At higher power levels, $\lambda_0$ would need to be adjusted according to techniques known by those skilled in the art. As expected, experiments confirmed that no change in $\lambda_0$ resulted as the power from pump source 7 was reduced.

Figure 3:
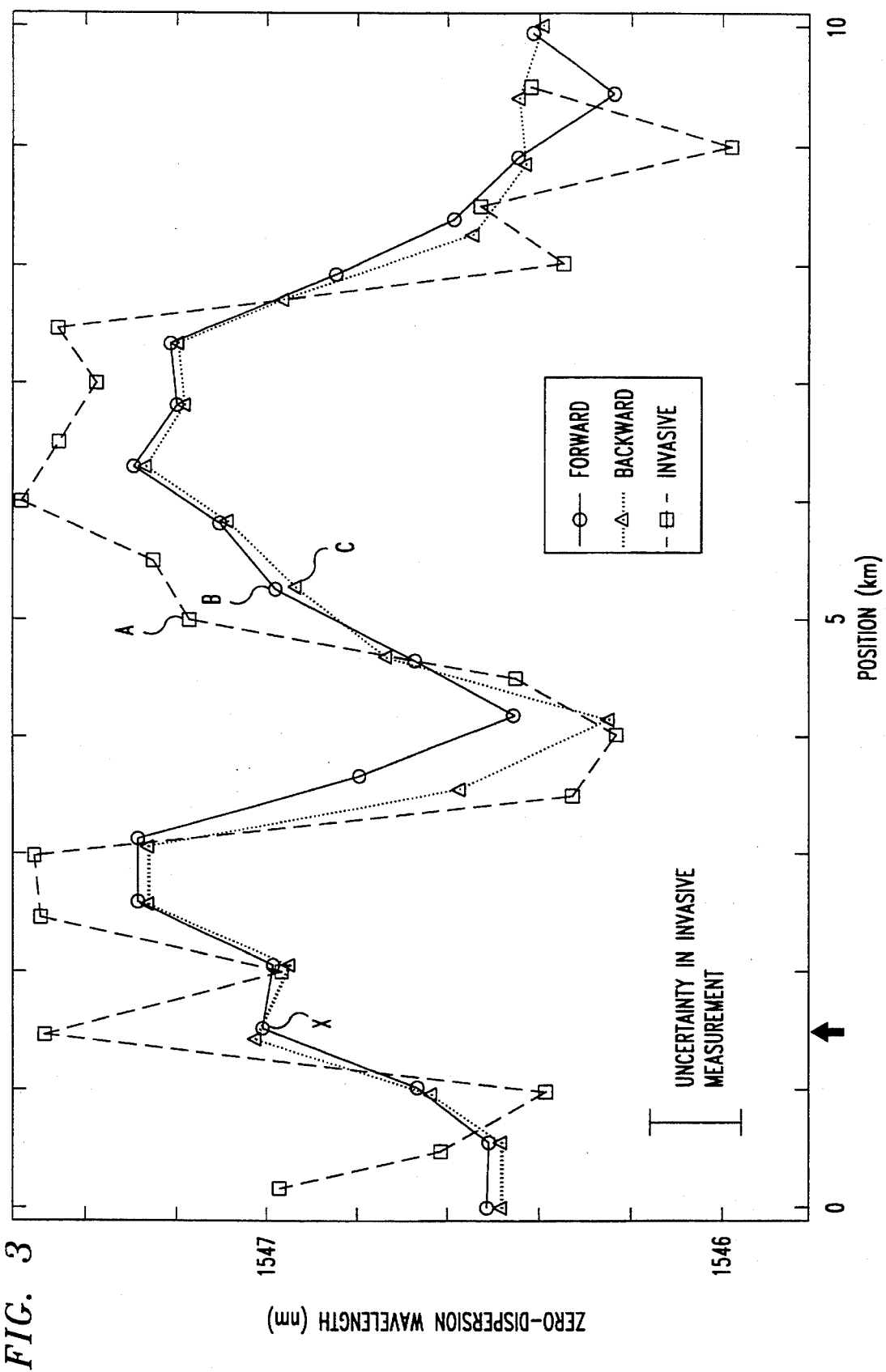
FIG. 3 shows results related to the measurement of dispersion-zero wavelengths of the optical fiber using the apparatus of FIG. 1.

FIG. 3 depicts results obtained by using the apparatus shown in FIG. 1. Zero-dispersion wavelengths of the fiber 9 were measured and then plotted on FIG. 3. In FIG. 3, plot B is a plot of the wavelengths which correspond to zero-dispersion wavelengths of the fiber 9 taken from the forward end, i.e., the setup shown in FIG. 1. Plot C indicates the zero-dispersion wavelengths of the fiber 9 taken from the backward end, i.e., the components shown in FIG. 1 are placed on the opposite side of the fiber 9, e.g., the spectrum analyzer 11 and the band-reject filter 12 were placed on the opposite side of the fiber 9. The remaining plot, plot A, corresponds to a plot of the zero-dispersion wavelengths of the fiber 9 which were taken by cutting the fiber 9 into 500 meter lengths and measuring the average dispersion of each 500 meter length using conventional dispersion equipment.

In FIG. 3 plots B and C include the 1.2 nm adjustment which was added for the reasons described above related to the curvature of $\beta(\omega)$. In FIG. 3 it can be seen that there is agreement between the non-destructive measurements, i.e. plots B and C, which were made from opposite ends. This demonstrates that there are probably no large systematic errors that depend upon the position of the overlap region. FIG. 3 also illustrates that the non-destructive measurements (plots B and C) agree with the destructive measurements (plot A) to within +/−0.2 nm. At least some of the discrepancy between plots B and C versus plot A is believed to be caused by wavelength variations corresponding to zero-dispersion within the overlap region.

Figure 4:
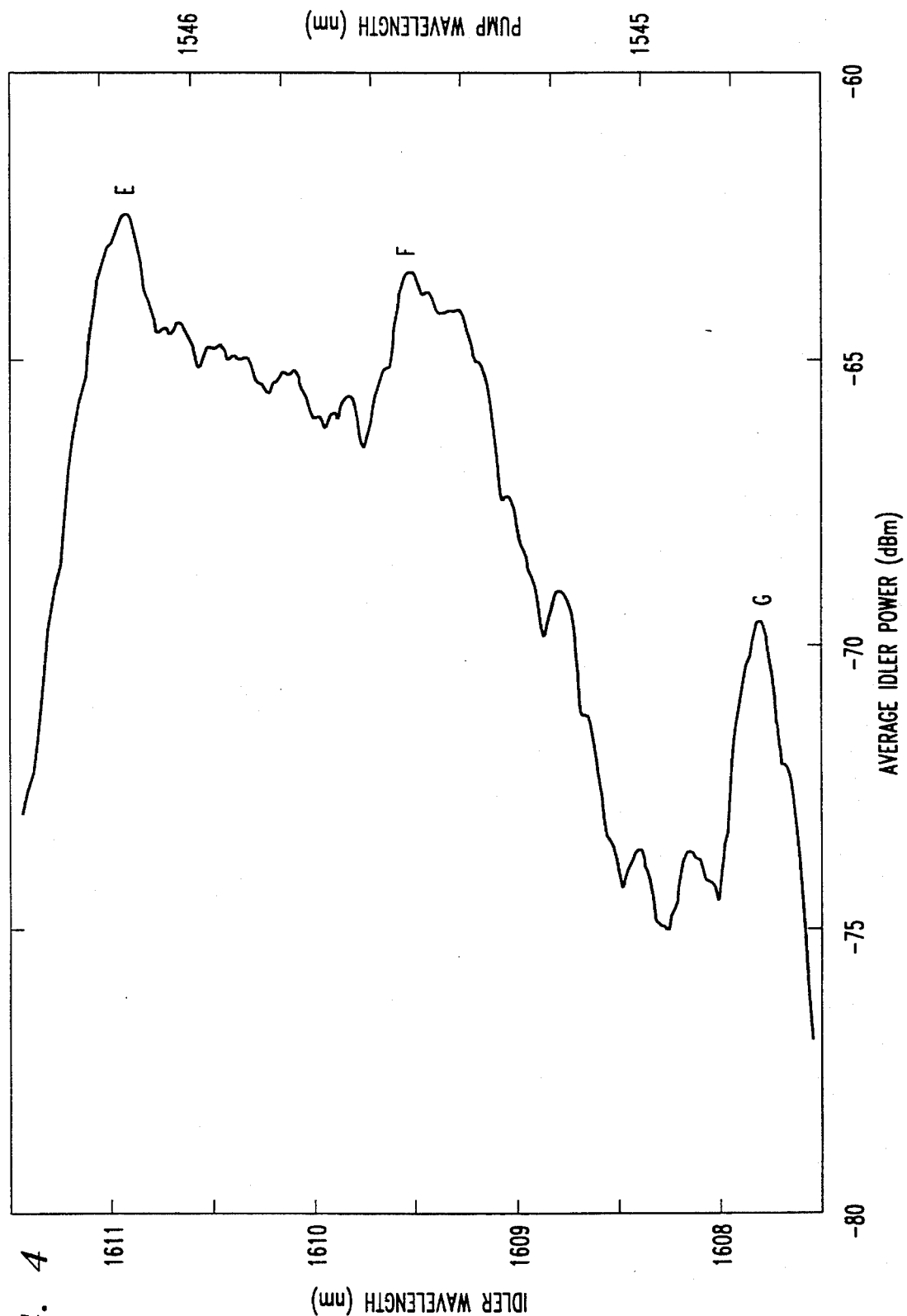
FIG. 4 shows part of an optical spectrum of a signal generated by the apparatus in FIG. 1 used in determining points plotted on curves in FIG. 3 according to an embodiment of the present invention.

FIG. 4 depicts characteristics of a part of an optical spectrum of the signal 16 resulting from mixing signals 14 and 15. In this example, the plot is taken around a wavelength (i.e., idler wavelength) of 1610 nm, while tuning the first pulse train or signal 15.

Reference now will be made to both FIGS. 3 and 4. The pulse trains from signals 14 and 15 may be set up such that both pulse trains overlap at a point 1.5 km into the fiber 9. This position is indicated by the arrow along the horizontal axis (the axis labelled "Position (km)") in FIG. 3. This arrow points towards point "X". Referring back to FIG. 4, there are two vertical axes, one labelled "Idler Wavelength" and one labelled "Pump Wavelength". The idler wavelength represents the wavelength of light of signal 16 being detected by the optical spectrum analyzer 11. The pump wavelength corresponds to the wavelength of light of signal 15. Using the pump wavelengths we can determine the dispersion-zero wavelengths of FIG. 3. In sum, the vertical axis in FIG. 3 corresponds to the vertical axis labelled "pump wavelength" in FIG. 4 after a 1.2 nm adjustment has been added to take into account the curvature of $\beta(\omega)$.

The spectrum plotted in FIG. 4 contains two large peaks labelled E and F, and one small peak labelled G at a position which is approximately 8 dB below peaks E and F.

For each point in the plots of FIG. 3, there is a corresponding optical spectrum corresponding to FIG. 4. For example, point X in FIG. 3 may be arrived at by using the spectrum of FIG. 4 as follows.

From peaks E and F, half-power or 3 dB points are located. Once these points are located, a technique well known by those skilled in the art is used to compute an average idler wavelength (leftmost vertical axis). This average idler wavelength is approximately 1610 nm in the example given above. Using this idler wavelength, the pump wavelength can be ascertained. If a horizontal line is drawn from the point 1610 nm on the left vertical axis labelled "idler wavelength" to the right vertical axis labelled "pump wavelength" a pump wavelength of approximately 1545 nm is indicated. After adding a correction due to the curvature of $\beta(\omega)$, the actual pump wavelength or zero-dispersion wavelength lies between 1546 and 1547 nm. This wavelength is then plotted as point X on the vertical axis of FIG. 3.

Plots, such as the one in FIG. 4, produced by the non-destructive, measurement technique of the present invention reveal more detailed information about variations in the dispersion of an optical fiber than would be normally expected from a 1 km position resolution. For example, a splice between optical fibers having different dispersion zero wavelengths may appear as two peaks in a mixing spectrum, i.e. on a graph such as FIG. 4. One of these peaks would be expected to grow as the delay between two mixed signals increased while the other peak would be expected to shrink.

While the invention has been described with reference to particular preferred embodiments, the invention is not limited to the specific examples given above. Other embodiments and modifications can be made by those skilled in the art without departing from the spirit and scope of the invention.

We claim:

1. An apparatus for non-destructively determining the dispersion-zero wavelengths of an optical fiber at points along the fiber, comprising:

a first signal source operating at a first wavelength that outputs a first pulse train of optical pulses each having a first pulse width;

a second signal source operating at a second wavelength that outputs a second pulse train of optical pulses each having a second pulse width, the second wavelength being separated in wavelength from the first wavelength, and optical pulses of the first and second pulse trains being separated by a delay such that at least one optical pulse of the first pulse train overlaps with at least one optical pulse of the second pulse train at a point along the fiber having a length of a specified range in order to determine the zero-dispersion wavelength of the fiber at the point; and a combiner for combining the first and second pulse trains into a mixed pulse train and for inputting the mixed pulse train into the fiber.

2. The apparatus according to claim 1, further comprising a variable delay device for varying the delay between optical pulses of the first and second pulse trains.

3. The apparatus according to claim 1 further comprising a detector for detecting the mixed pulse train.

4. The apparatus according to claim 3 further comprising a display device for displaying characteristics of at least a part of the mixed pulse train.

5. The apparatus according to claim 1, further comprising a tuner for tuning the first wavelength over a wavelength range which includes the zero-dispersion wavelength of the point of the fiber, said zero-dispersion wavelength being determined when said first, second and mixed pulse trains are phase-matched.

6. The apparatus according to claim 1 wherein the wavelength separation between the first and second wavelengths is at least 60 nanometers.

7. The apparatus according to claim 1 wherein the wavelength separation between the first and second wavelength is less than 60 nanometers.

8. The apparatus according to claim 1 wherein the first and second pulse widths are at least 30 picoseconds.

9. The apparatus according to claim 1 wherein one of the first or second pulse widths are less than 30 picoseconds.

10. The apparatus according to claim 1 wherein the first and second pulse widths are less than 30 picoseconds.

11. The apparatus according to claim 1 wherein the specified range is one kilometer or less.

12. The apparatus according to claim 1 further comprising a polarization scrambler for modifying the polarization of the first pulse train.

13. The apparatus according to claim 1 further comprising a polarization scrambler for modifying the polarization of the second pulse train.

14. The apparatus according to claim 1 further comprising a polarization scrambler for modifying the polarization of the first and second pulse trains.

15. A method for non-destructively determining the dispersion-zero wavelengths of an optical fiber at points along the fiber comprising:

generating a first pulse train of optical pulses each having a first pulse width at a first wavelength;

generating a second pulse train of optical pulses each having a second pulse width at a second wavelength, the second wavelength being separated in wavelength from the first wavelength;

generating a delay between pulses of the first and second pulse trains such that at least one optical pulse of the first pulse train overlaps with at least one optical pulse of the second pulse train at a point having a length of a specified range along the fiber in order to determine the zero-dispersion wavelength of the fiber at the point;

optically combining the first and second pulse trains into a mixed pulse train; and inputting the mixed pulse train into the fiber.

16. The method according to claim 15 further comprising varying the delay between optical pulses of the first and second pulse trains.

17. The method according to claim 15 further comprising:

tuning the first wavelength over a wavelength range which includes the zero-dispersion wavelength at the point of the fiber, said zero-dispersion wavelength being determined when said first, second and mixed pulse trains are phase-matched;

detecting the mixed pulse train;

displaying characteristics of at least a part of the mixed pulse train;

calculating an average wavelength for the part of the mixed pulse train;

calculating an uncorrected, dispersion-zero wavelength from the average wavelength; and adding a correction factor to the uncorrected dispersion-zero wavelength to arrive at a corrected dispersion-zero wavelength.

18. The method according to claim 15 wherein the second wavelength is separated in wavelength from the first wavelength by at least 60 nanometers.

19. The method according to claim 15 wherein the second wavelength is separated in wavelength from the first wavelength by less than 60 nanometers.

20. The method according to claim 15 wherein the first and second pulse widths are at least 30 picoseconds.

21. The method according to claim 15 wherein one of the first or second pulse widths are less than 30 picoseconds.

22. The method according to claim 15 wherein the first and second pulse widths are less than 30 picoseconds.

23. The method according to claim 15 wherein the specified range is 1 kilometer or less.

24. The method according to claim 15 further comprising modifying the polarization of the first pulse train.

25. The method according to claim 15 further comprising modifying the polarization of the second pulse train.

26. The method according to claim 15 further comprising modifying the polarization of the first and second pulse trains.

* * * * *